United States Patent [19]

Bommier et al.

[11] Patent Number: 5,242,746
[45] Date of Patent: Sep. 7, 1993

[54] FRICTION ELEMENTS OF COMPOSITE CARBON-CARBON MATERIAL AND OF DIFFERENTIAL TEXTURE

[75] Inventors: Christophe Bommier, Paris; Jean-Louis Chareire, Levallois-Perret, both of France

[73] Assignee: Le Carbone-Lorraine, Courbevoie, France

[21] Appl. No.: 696,125

[22] Filed: May 6, 1991

[30] Foreign Application Priority Data

May 10, 1990 [FR] France ............................ 90 06488
Mar. 25, 1991 [FR] France ............................ 91 03827

[51] Int. Cl.⁵ .................. F16D 69/02; F16D 13/60; B32B 9/00; B32B 33/00
[52] U.S. Cl. ........................ 428/252; 188/250 C; 188/251 A; 188/251 R; 192/107 M; 192/107 R; 428/245; 428/246; 428/280; 428/282; 428/284; 428/288; 428/292; 428/297; 428/298; 428/304.4; 428/311.5; 428/316.6; 428/317.9; 428/408; 428/902; 428/908.8
[58] Field of Search ............... 428/284, 212, 220, 294, 428/292, 311.1, 311.5, 408, 252, 245, 246, 280, 282, 288, 290, 298, 297, 304.4, 316.6, 317.9, 902, 908.8; 188/250 C, 251 R, 251 A; 192/187 R, 107 M

[56] References Cited

U.S. PATENT DOCUMENTS 4,457,967 7/1984 Chareire et al. ................ 188/251 A
5,007,508 4/1991 Lacombe ........................ 188/251 A

FOREIGN PATENT DOCUMENTS 0402915 12/1990 European Pat. Off. .
1492712 11/1977 United Kingdom .

Primary Examiner—George F. Lesmes
Assistant Examiner—James D. Withers
Attorney, Agent, or Firm—Dennison, Meserole, Pollack & Scheiner

[57] ABSTRACT

A multi-layer friction element is disclosed consisting of carbon-carbon composite material comprising a structure layer of so-called "coarse" texture comprising segments of rovings and at least one friction layer of so-called "fine" texture comprising fibre segments. A method also is disclosed for producing the friction element by preparation of a fibrous substrate by introducing segments of roving and/or fibers into a mould preferably by means of a distribution apparatus. Further disclosed is an apparatus for automatically obtaining a fibrous substrate of predetermined texture.

12 Claims, 8 Drawing Sheets

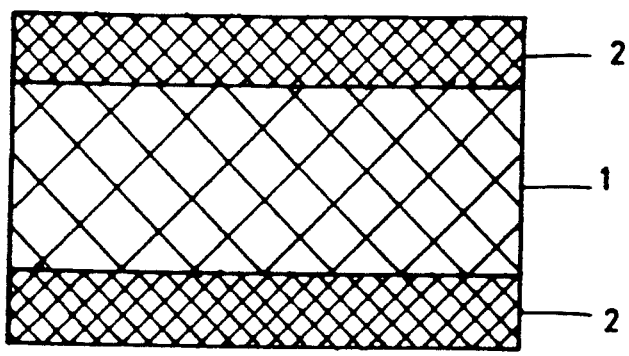
FIG 1.1
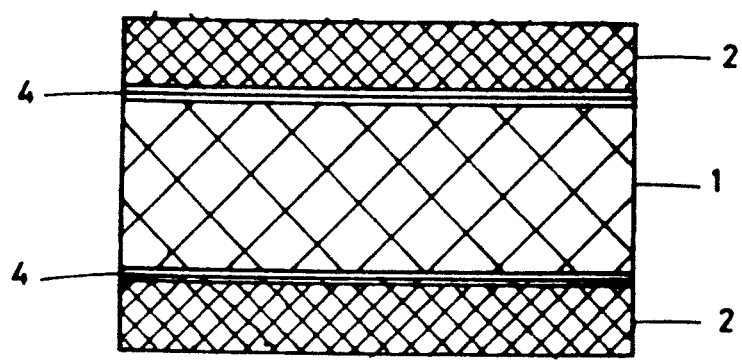
FIG. 1.2
FIG. 1.3
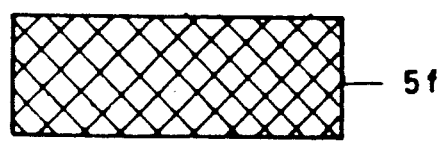
FIG. 1.4

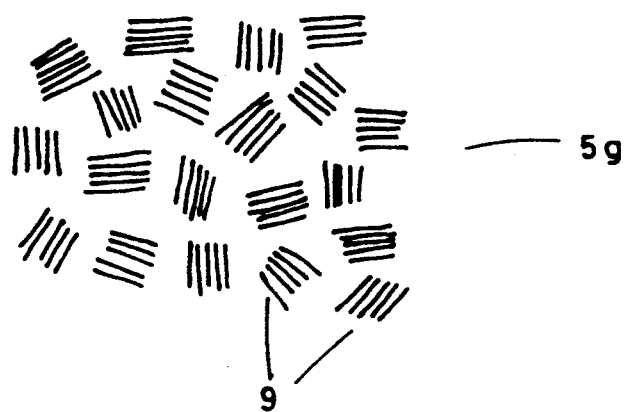
FIG. 2.1
FIG. 2.2

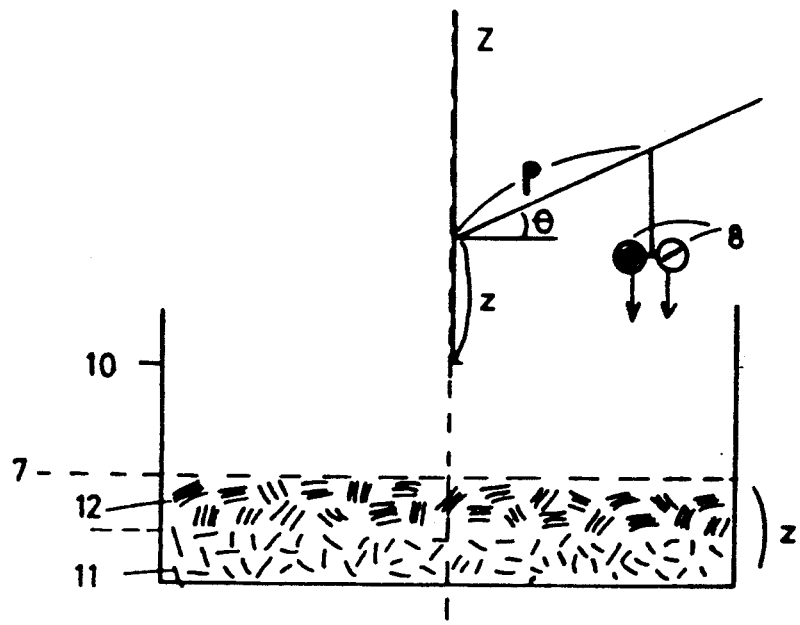
FIG. 3.1
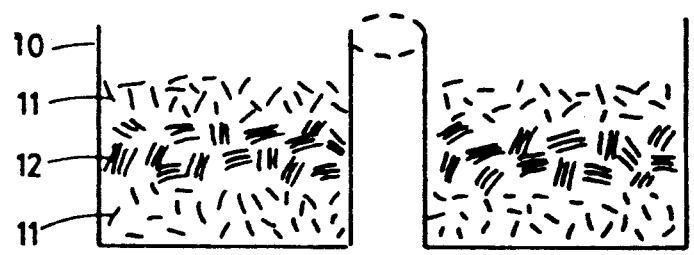
FIG. 3.2
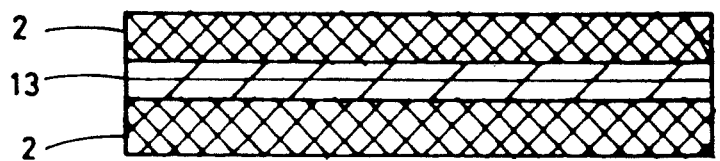
FIG. 3.3

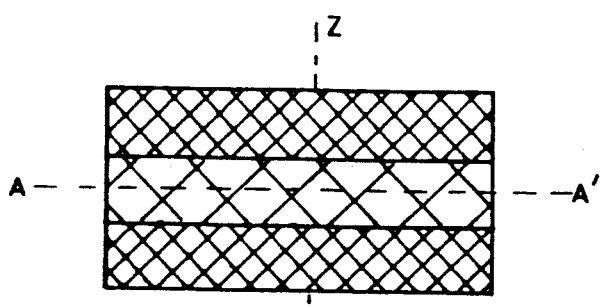 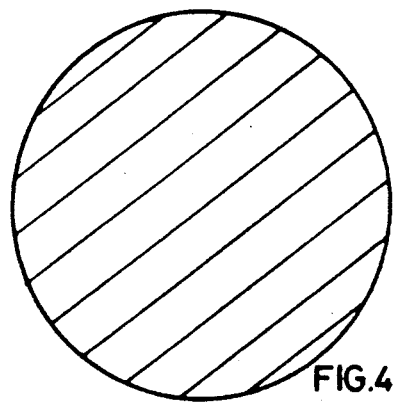
FIG. 4.1    FIG.4.1A
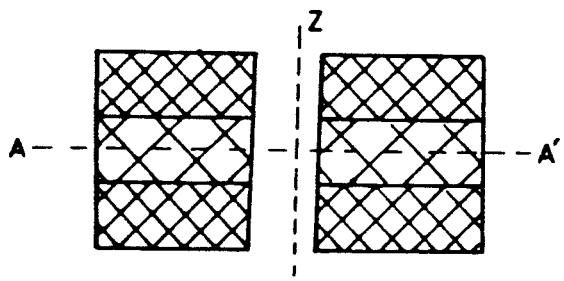 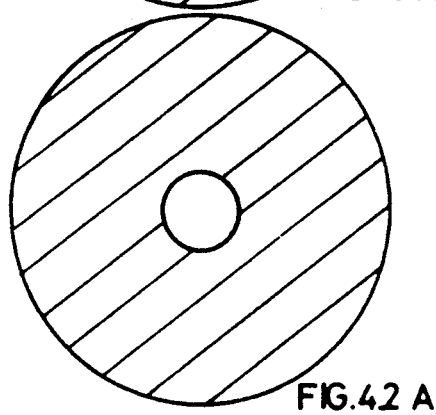
FIG. 4.2    FIG.4.2A
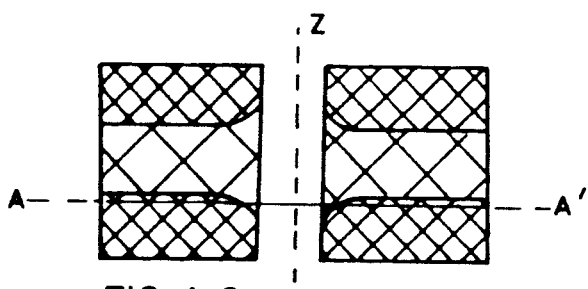 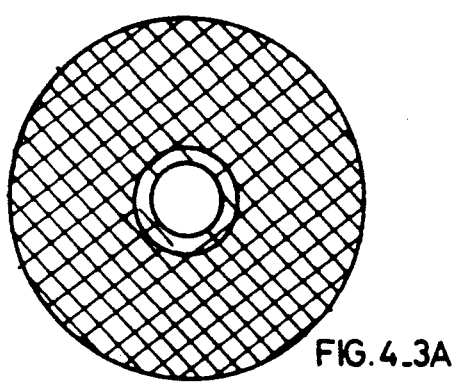
FIG. 4.3    FIG.4.3A
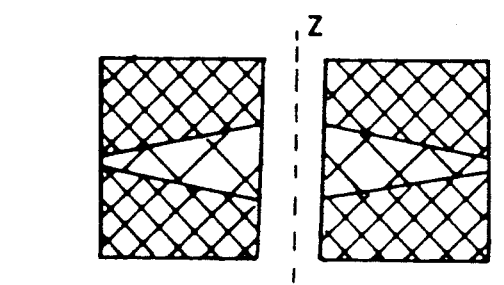
FIG. 4.4

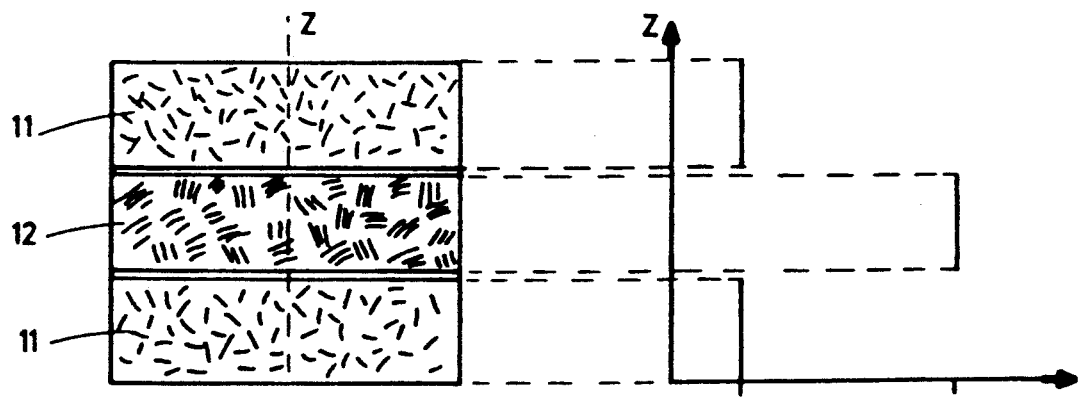
FIG.5.1
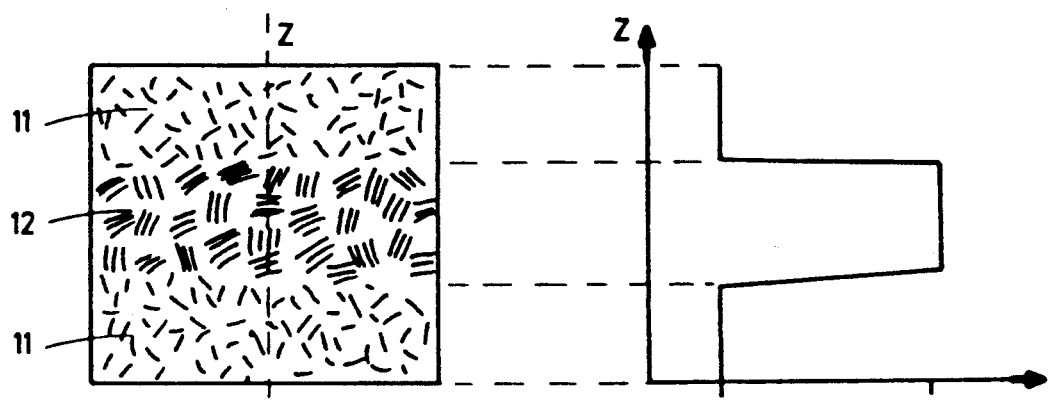
FIG.5.2
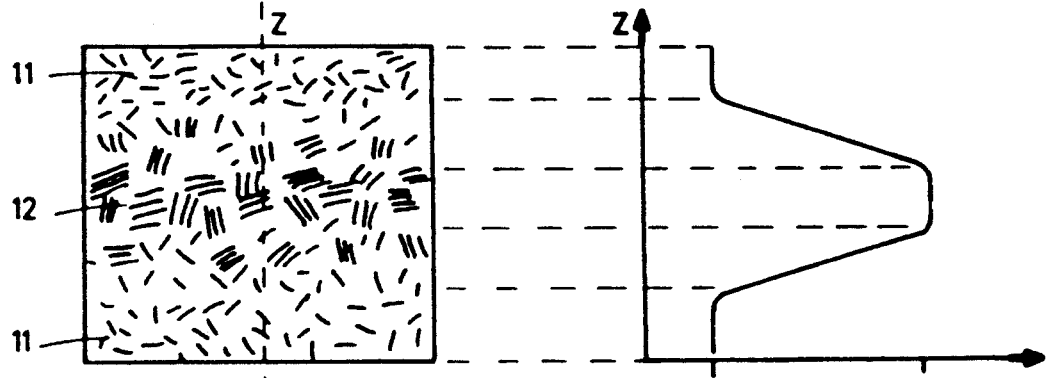
FIG.5.3

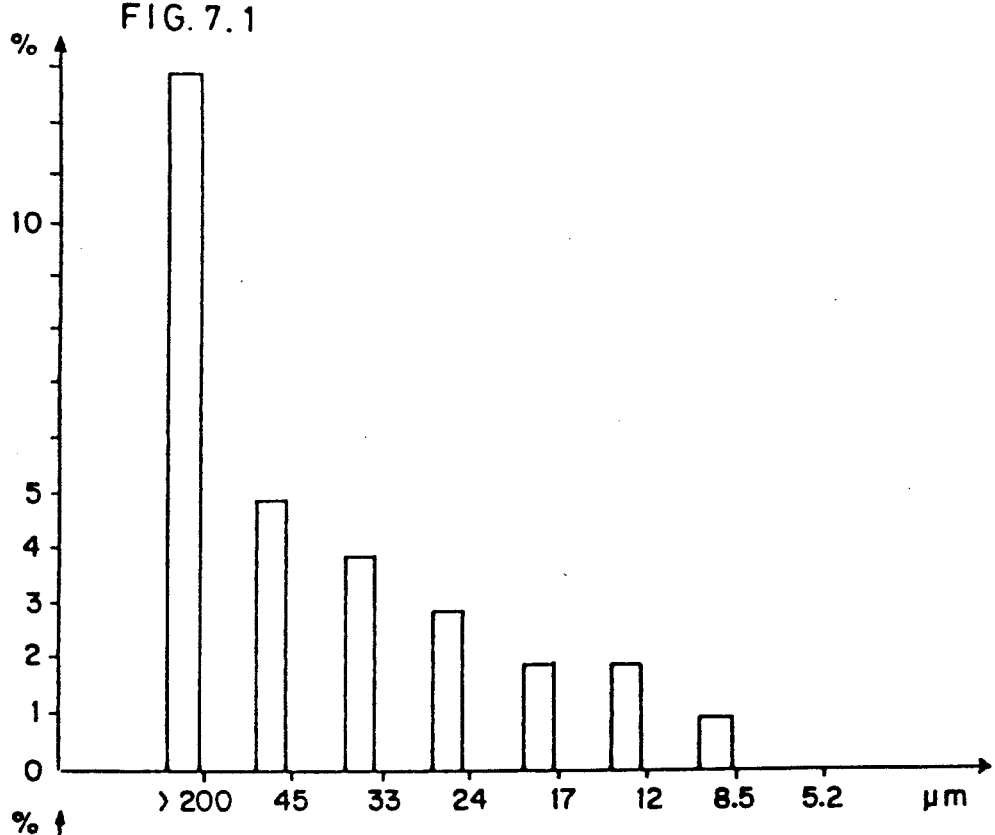
FIG. 7.1
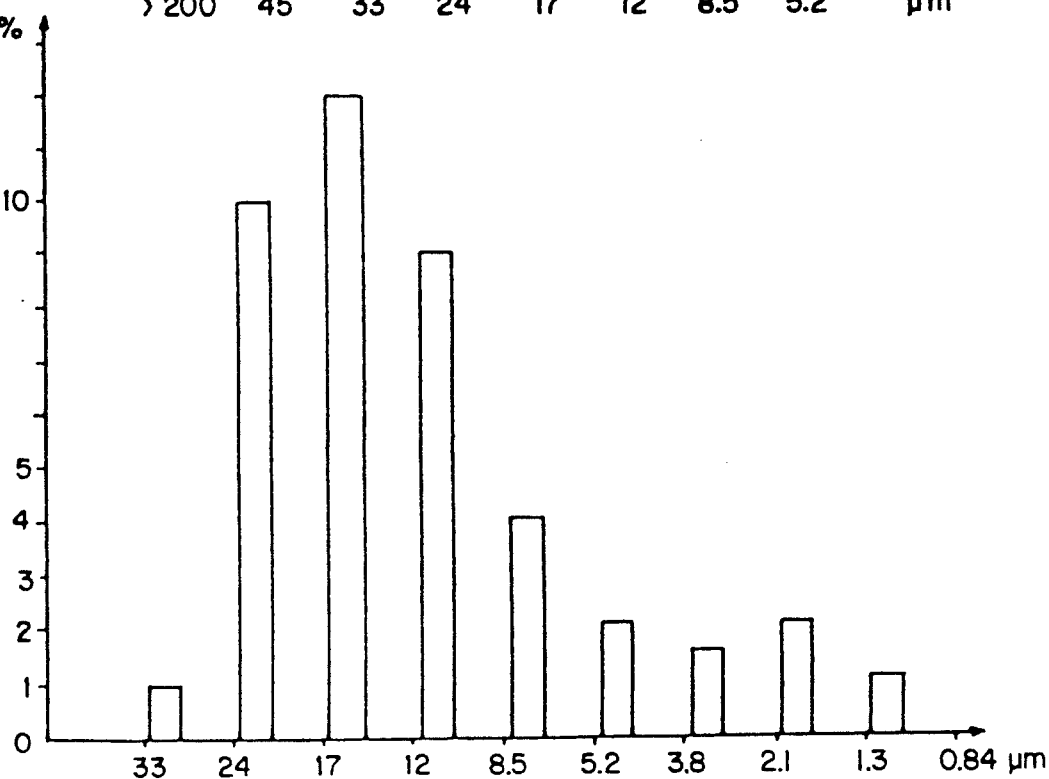
FIG. 7.2

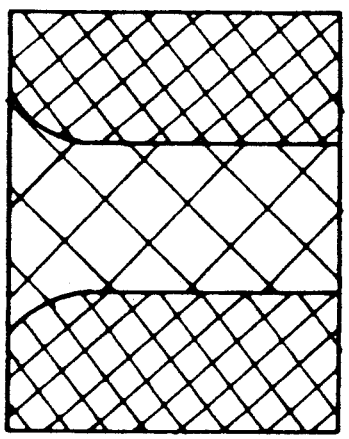 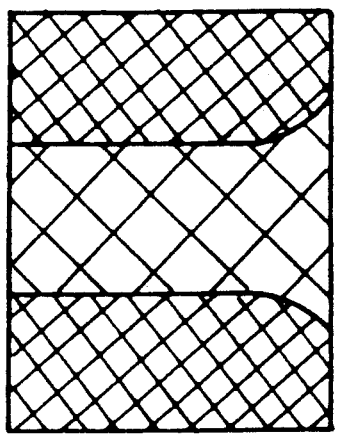
FIG. 8.1
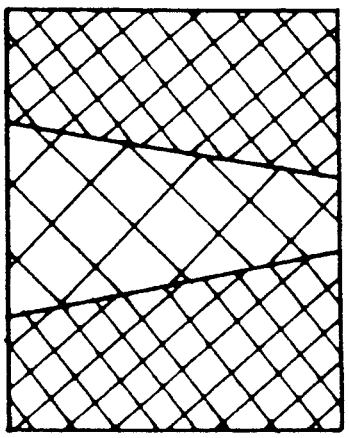 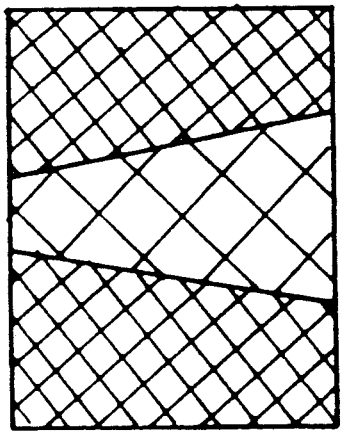
FIG. 8.2

FRICTION ELEMENTS OF COMPOSITE CARBON-CARBON MATERIAL AND OF DIFFERENTIAL TEXTURE

FIELD OF THE INVENTION

The invention relates to the field of friction materials consisting of composite carbon-carbon material and more precisely multi-layer friction materials which are entirely of composite carbon-carbon and which have a differential texture, and also a method of producing multi-layer friction elements and an apparatus for carrying out the method.

DESCRIPTION OF RELATED ART

The composite carbon-carbon materials which will be hereinafter referred to in abbreviated form as "C—C composites" have for many years been acknowledged to be friction materials which are of particular interest especially in high-performance brakes, that is to say more especially when what is desired is a high level of braking power per kilogramme of friction material and especially in the field of brakes for aeronautical applications.

Generally speaking, C—C composites are, as is well known, constituted by a carbon fibre-based substrate and a carbonaceous matrix. This latter may be obtained either by one or a plurality of impregnations of the fibrous substrate with a resin or a pitch followed by carbonisation or by chemical deposition in vapour phase of pyrolytic carbon or by associating both methods. Furthermore, these composites may undergo a heat treatment at a very high temperature referred to as graphitisation, typically performed at above 2,300° C.

Brake discs are already known which comprise a stack of layers of carbonaceous materials. Thus, numerous patents such as FR 2 313 601, FR 2 260 726 and U.S. Pat. No. 3,936,552 describe brake discs which generally comprise a central layer or core of carbon or crude graphite on which are fixed friction layers of C—C composite offering better resistance to wear and tear than does the central carbon or crude graphite layer. One of the reasons invoked to justify this type of stacking is the cost of the carbon or of the crude graphite, which is less than that of a composite C—C material.

Also, thanks to FR 2 225 654, brake discs are known which result from assembling together a plurality of layers of C—C composites by adhesives or by mechanical means in order to have a central re-usable layer which is covered with a wearing layer, the central layer providing the mechanical strength and the wearing layer constituting a replaceable wearing plate.

However, although FR 2 225 654 clearly describes the general concept and interest of a multi-layer brake consisting of C—C composite with a layer providing mechanical strength and one or more layers providing for the friction function, this patent does not say how to obtain a multi-layer brake of high technical performance nor how to obtain such a layer economically.

SUMMARY OF THE INVENTION

The object of the invention is a multi-layer friction element of C—C composite comprising a structure layer and at least one friction layer of high technical performance and having characteristics adapted to the functions of each layer, a high level of mechanical strength and in particular a high resistance for the structure layer, advantageous tribological properties and in particular a level of wear and tear which is not very high for the friction layer or layers.

Also, the invention has as object an economic method of producing multi-layer friction materials and also an apparatus for carrying out the method.

The primary object of the invention is a multi-layer friction element comprising a structure layer (1) of carbon-carbon composite material of which at least one surface is covered with a friction coating (2) of carbon-carbon composite material rigid with the said structure layer (1) and characterised in that on the one hand the structure layer (1) is obtained from a so-called "coarse" (5g) texture fibrous substrate having an average pore diameter in excess of 100 μm and constituted by carbon fibre rovings or carbon fibre precursors and in that on the other hand the friction layer (2) is obtained from a fibrous substrate (5f) of so-called "fine" texture having a mean pore diameter of less than 50 μm and constituted by fibre segments (6) of carbon or carbon precursor which are randomly distributed.

Indeed, with a view to improving the performance of the friction elements of multi-layer material, the Applicants have studied the effect of the texture of the C—C composite materials and in particular the influence of the fibrous substrate on the properties both mechanical and tribological. They were surprised to make the following findings:

with regard to resilience and therefore the aptitude for impact resistance, a substrate of coarse texture (5g) makes it possible to obtain composites having a resilience of around 40 to 50 kj/m$^2$ while a fine texture substrate (5f) leads to a low resilience composite of around 3 to 5 kJ/m$^2$, all other things being equal.

certain mechanical characteristics such as the modulus and resistance to rupture do not alter substantially with the texture of the fibrous substrate, in contrast to others such as the resistance to flexion which ranges from 150 to 200 MPa for a coarse texture composite and 40 to 120 MPa for a fine texture material.

with regard to the resistance to wear and tear, it has been found that a fine texture fibrous substrate made it possible to obtain a composite material with a high level of wear and tear which could be up to 6 times less than that of a composite material with a fibrous substrate of a coarse texture.

Research conducted by the Applicants has revealed the major role played by the fibrous substrate and has made it possible to establish a criterion of texture of the fibrous substrate which makes it possible either to reinforce the mechanical characteristics of the structure layer by using a fibrous substrate of a coarse texture or to reinforce the tribological properties of the friction layer by using a fibrous substrate of fine texture with randomly orientated fibre segments so that by associating layers of different texture it is possible to obtain multi-layer brake elements which are optimised in respect of both mechanical and tribological stresses.

The term "average pore diameter in excess of 100 μm" is taken to mean that at least 50% by volume of pores is constituted by pores having a diameter in excess of 100 μm. And, similarly, the term "mean pore diameter less than 50 μm" means that at least 50% of the pore volume consists of pores having a diameter of less than 50 μm.

For practical reasons, the pore diameter is measured not on the fibrous substrate as produced according to the invention but on this fibrous substrate after the onset of densification by carbon deposition in order to be able to handle the fibrous substrate without altering it and so having significant and comparative measurements. By way of indication, a fibrous substrate according to the invention and having an apparent density of 0.6 becomes manipulable with a view to a pore diameter measurement when its density, by carbon deposition, increases to approx. 0.9, knowing that the final apparent density is around 1.8 at the end of densification.

It is worth noting that pore fineness and total porosity (or pore volume) are different magnitudes which may vary independently of each other. Thus, during tests conducted by the Applicants, it was observed that the coarse texture substrate (5g) had a total porosity which was less than that of the fine texture substrate (f). For example, as indicated in Example 1, the coarse texture substrate (5g) has a porosity of 30% (percentage of the total volume) while that of the fine texture fibrous substrate (5f) has a total porosity of 42% likewise determined after the onset of densification.

DESCRIPTION OF THE PREFERRED EMBODIMENTS

According to a first embodiment of the invention, the fibrous substrate consists entirely of randomly orientated segments:
- segments of carbon fibre (6) or carbon precursor forming the so-called fine texture fibrous substrate (5f) of the friction layer (2),
- segments of rovings (9) of carbon fibre or carbon precursor forming the so-called coarse texture fibrous substrate (5g) of the structure layer (1).

According to the invention, the length of the said roving segment is comprised between 5 and 60 mm and that of the said fibre segment is comprised between 0.05 and 60 mm. The fibrous substrate of the friction layer (5f) may advantageously consist of crushed carbon fibres comprising fibre segments (6) having a mean length of between 0.2 and 2 mm.

The carbon fibres or carbon precursor which may be used for producing the fibrous reinforcement according to the invention do, as is well known, take the form of very long rovings consisting of a vast number of parallel fibres, typically 1,000 to 320,000 elementary carbon fibres or carbon precursor, each fibre having a diameter which is generally comprised between 5 and 12 $\mu$m.

According to the invention, the fibrous substrate of a structure layer (1) is constituted by carbon fibre or carbon precursor rovings. The term roving is taken to mean a large number of elementary fibres which is more or less that of the initial roving, generally above 1,000 and possibly as much as 320,000.

The term roving segment (9) is taken to mean a portion of a roving comprising a vast number of substantially parallel elementary fibres of a length previously defined.

On the other hand, the fibrous substrate of a friction layer consists of fibre segments (6), each fibre segment being of a length as described hereinabove and corresponding ideally to a single fibre and in practice to a small number of assembled fibres, the number typically being less than 100.

Thus, in the case of a friction layer (2), the fibrous substrate (5f) based on fibre segments (6) may be shown diagrammatically by FIG. 1-4 and FIG. 2-2 where any line will represent an elementary fibre or a small number of fibres (less than 100), while FIG. 1-3 and FIG. 2-1 do, in the case of a structure layer (1), represent a fibrous substrate (5g) based on segments of rovings (9), that is to say on a basis of "packages" constituted by a vast number of substantially parallel elementary fibre segments.

A fibrous substrate which consists only of roving segments or fibre segments forms an uninterrupted inter-entanglement of roving segments/fibre segments and makes it possible to obtain a multi-layer friction element in a single piece with no discontinuity of the fibrous substrate between the part containing a coarse texture fibrous substrate (5g) and the part containing a fine texture fibrous substrate (5f) nor with any discontinuity in the carboraceous matrix. In this case, the fibrous substrate is uninterrupted between the friction layer (2) and the structural layer (1) and varies continuously in texture by mixture and interpenetration of segments of fine texture and segments of coarse texture at the interface between the two layers, which ensures maximum cohesion between a friction layer and a structure layer.

In this case, therefore, there is no specific connecting layer, for example a layer of adhesive between a structured layer and a friction layer but only, at the interface, an uninterrupted entanglement of segments of rovings and fibres over a more or less considerable thickness. In the same way, the carbonated matrix is continued over all the friction element since it results from an overall densification over the whole of the fibrous substrate, which makes a tremendous contribution to the cohesion of the various layers.

According to another method according to the invention, the fibrous substrate of a C—C composite friction element may also comprise a carbonaceous material in the form of a sheet:
- which in the case of the structure layer, will be an orientated fibrous substrate (13), typically tissue-based, or based on products woven in 3 dimensions and obtained from carbon fibre rovings or carbon precursor, making it possible, possibly after compression, to arrive at a mean pore diameter of more than 100 $\mu$m.
- which in the case of the friction layer will be a mat or a carbon felt or carbon precursor constituted by an inter-entangled arrangement of ideally elementary fibres and making it possible, possibly after compression, to obtain a mean pore diameter which is less than 50 $\mu$m.

Finally, according to another object of the invention, the friction element may be obtained from a "mixed" fibrous substrate constituted:
- either by a fibrous substrate constituted by a stack of carbon tissues or carbon precursor for the structure layer (1) and by a fibrous substrate constituted by fibre segments according to the invention and preferably fibre which has been crushed for the friction layer (2),
- or by a fibrous substrate constituted by roving segments for the structure layer (1) and by a fibrous substrate constituted by a mat or felt for the friction layer (2).

Generally speaking, the invention relates to a brake element the fibrous substrate of which has a differential texture which may be adapted to any particular problem. This differential texture is based essentially on the presence of either rovings in the structure layer (1) or ideally elementary fibres in the friction layer (2) and therefore depends upon the number of locally agglomerated elementary fibres, a woven material being regarded as constituted by rovings and a felt or a mat as being constituted of fibres. This number is typically at least 10 times greater in the case of a roving (>1,000) than in the case of a fibre (<100) according to the invention.

Usually, this texture will vary according to an axis Z at right-angles to the various layers as indicated hereinabove. However, there may well be cases where the differential texture may vary within the plane of one layer, radially, for example in order to reinforce the central part of a brake disc, as shown in FIGS. 4-3 and 4-4 or in order to reinforce the outer part, as illustrated in FIGS. 8-1 and 8-2.

According to the invention, the expression "differential texture" therefore embraces various cases. Some are shown in FIGS. 4, 5 and 8 to illustrate the concept of differential texture.

Whether the fibrous substrate (5g) of coarse texture consists of rovings (woven fabrics) or segments of rovings, its apparent density prior to densification is between 0.3 and 0.7 whereas that of the finely textured fibrous substrate is comprised between 0.05 and 0.3. The total apparent density of the fibrous substrate (5g) and (5f) is comprised between 0.1 and 0.7.

The fibrous substrate (5g) represents from 10 to 50% by volume of the C—C composite constituting the structure layer (1) while the fibrous substrate (5f) represents from 3 to 25% by volume of the C—C composite constituting the friction layer (2).

According to the invention, the carbonated matrix of the multi-layer C—C composite, whether it is a structure layer or a friction layer, is not specific to the invention and in known manner it results from densification of the compressed fibrous substrate either by chemical deposition of pyrolytic carbon in the vapour phase or by one or more impregnation treatments using a resin or a pitch producing a high carbon level after carbonisation, treatments followed by carbonisation or the association of both processes. After densification, the friction element according to the invention is a C—C composite material the density of which is comprised between 1.55 and 1.8 which may possibly be subjected to a later graphitisation treatment.

The invention likewise relates to friction elements consisting of an assembly of structure layers (1) of C—C composite and of friction layers (2) of C—C composite obtained respectively by densification of coarsely texture fibrous substrate (5g) and finely textured substrate (5f), the assembly being performed by any known means, particularly by a connecting layer (4).

Preferably, for the connecting layer (4), a resin is used which by heating leads to the formation of a generally porous carbonated layer. The friction element obtained by assembly may have a continuous carbonated matrix over all the friction element because it is advantageous to assemble structure and friction layers having a residual porosity and to complete manufacture of the friction element by a deposition of carbon in order to densify all the layers as well as the connecting layer (4).

The invention makes it possible to obtain friction elements which generally take the form of discs of a diameter which may be as much as or even more than 600 mm (outside diameter) and which may typically have a central structure layer the thickness of which would be around 10 to 20 mm, covered with two friction layers of a thickness of around 3 to 7 mm.

As already mentioned, thanks to the differential texture of the structure and friction layers of C—C composite material, the invention makes it possible to obtain high specific performance levels, that is to say considered per kilogramme of friction element, in terms of mechanical properties, resilience in particular, as well as the tribological properties, principally resistance to wear. As is well known, it is therefore possible to renew a friction element by replacing the worn friction layer by a new layer obtained according to the invention.

Furthermore, particularly in the case of a fibrous substrate which consists of segments of rovings or fibres, the friction element according to the invention has the advantage of having no localised absence of substrate on the scale of the dimensions of local substrate, that is to say within a maximum volume of approx. 0.05 mm$^3$ for a finely texture fibrous substrate and approx. 5 mm$^3$ for a coarsely textured substrate.

The second object of the invention is an economic method of manufacturing these friction elements from C—C composite material.

According to a first method, the process of manufacturing a friction element consisting of multi-layer carbon-carbon composite material consisting of a structure layer (1) and at least one friction layer (2) comprises a stage involving manufacture of a fibrous substrate of desired geometrical form, a possible carbonisation stage if the said fibrous substrate is based on a carbon fibre precursor, and a stage involving densification of the said fibrous substrate by carbon deposition in order to form the carbonated matrix, the said stage of producing the fibrous substrate of a desired geometrical form being characterised in that all or part of the said fibrous substrate is produced by introducing into a mould (10), possibly by means of a distribution device, segments of carbon fibre rovings or carbon precursor of a length comprised between 5 and 60 mm to constitute the fibrous substrate (5g) of the structure layer (1), segments of carbon fibres or carbon precursor of a length comprised between 0.05 and 60 mm to constitute the fibrous substrate (5f) of the friction layer (2), and compressing the segments of rovings and fibres in order to obtain a fibrous substrate (5f, 5g) with an overall apparent density of between 0.1 and 0.7 and constituted by segments of rovings and/or fibres which are tangled and orientated at random.

The compressed fibrous substrate takes the general form of the mould which will therefore be cylindrical if the friction element is to be in the shape of a disc, which is usually the case. However, the method makes it possible to produce fibrous substrates of any geometrical cross-section.

According to an alternative form of this first method, only a part of the fibrous substrate is formed from segments of rovings and/or fibres, its preparation being completed by the addition of elements cut from sheets of carbon or carbon precursor, sheets constituted by woven fabrics or felt/mat according to whether it is a coarsely or finely textured fibrous substrate which is required. These different parts of the substrate may be assembled by means of adhesives or by compression. Once shaped, the overall fibrous substrate is subjected to a densification treatment by carbon deposition.

According to a second method, the process of manufacturing a friction element of multi-layer carbon-carbon composite material consisting of a structure layer and at least one friction layer comprises manufacture of a structure layer (1) of carbon-carbon composite material and at least one friction layer (2) of carbon-carbon composite material, their assembly by any known means such as a connecting layer (4), characterised in that the structure layer is produced by deposition of carbon on a coarsely textured fibrous substrate (5g) with a mean pore diameter in excess of 100 μm while the friction layer is produced by carbon deposition on a finely textured fibrous substrate (5f) with a mean pore diameter less than 50 μm, the fibrous substrates being carbonised beforehand in the case of a fibrous substrate consisting of a carbon fibre precursor.

The coarsely texture fibrous substrate (5g) is obtained from a sheet, a woven material of carbon fibre or carbon precursor, or from segments of carbon fibre or carbon precursor rovings of a length comprised between 5 and 60 mm, placed in a mould, possibley with the help of a dispensing means, then compressed until the apparent density is between 0.3 and 0.7.

The finely textured fibrous substrate (5f) is obtained from a mat, a felt of carbon fibre or carbon precursor, or from segments of carbon fibres or carbon precursor of a length comprised between 0.05 and 60 mm, placed in a mould (10), possibly with the help of a dispensing device, then possibly compressed to an apparent density which is comprised between 0.05 and 0.3.

Therefore, this second procedure may advantageously be employed for renewing worn friction elements no longer comprising more than one structure layer (1) of C—C composite material. However, it is likewise possible to renew a worn friction element by subjecting to densification by carbon deposition a structure layer (1) of C—C composite material coated with at least one layer of finely textured fibrous substrate (5f), this procedure constituting to a certain extent a blend of the two aforementioned procedures.

To carry out the invention when the fibrous substrate comprises segments of rovings or fibres, the Applicants have perfected an apparatus for dispensing segments of rovings and/or fibres which is highly effective in carrying out the method, ensuring automatic filling of the mould.

According to the invention, the means of distributing segments of rovings or fibres comprises at least one head (8) for the distribution of segments of rovings and/or fibres in a relative movement in relation to the mould (10) and sweeping all the horizontal surface of the mould in order progressively and regularly and by successive layers to fill the mould with randomly orientated segments of rovings (9) and/or fibres (6) of carbon while maintaining a substantially horizontal plane of distribution (7), the proportion of segments of rovings and/or fibres of carbon distributed by the head or heads preferably being subject to the coordinates (z, ρ, θ) of the portion of plane of distribution receiving the segments of carbon roving and/or fibres in order to have locally in the mould and in a predetermined manner a fibrous substrate of the desired texture which may after possible compression range from a fine texture having an average pore diameter of less than 50 μm to a coarse texture with an average pore diameter greater than 100 μm.

This distribution device comprises one or a plurality of distributor heads (8) possibly side by side, provided with means for the continuous or step-wise supply of carbon roving(s) or fibres of great length, possibly lubricated or pre-impregnated, and with means of cutting the roving(s) into segments (6, 9) of predetermined length, and possibly with means of facilitating dispersion of the segments obtained from possibly lubricated or impregnated roving in such a way as to obtain fibre segments (6), and with means either for displacement of the head(s) itself or themselves or for transporting the segments obtained from continuous rovings so that filling of the mould is accomplished by substantially horizontal and successive layers (7) and so that the segments (6, 9) are placed at a precise point in the mould defined by coordinates (z, ρ, θ) and finally with data means to control the proportion of segments of fibres/rovings (defined by the volumetric percentage of one of the two types of segments) according to the position of the segments in the mould in order to have the desired texture localised within the friction element in accordance with a pre-set filling programme.

The apparatus may comprise two distribution heads one supplied with lubricated or pre-impregnated carbon fibre roving, providing segments of rovings (9), the other supplied with carbon fibres which are neither lubricated nor pre-impregnated, providing fibre segments (6). This latter head may, according to an alternative embodiment, be supplied with crushed carbon fibres or carbon precursor, supplying fibre segments (6).

According to one arrangement of the apparatus, it may have a single distribution head supplied with lubricated or pre-impregnated carbon fibre roving, providing at a given point in the mould and according to the filling programme segments (9) of roving of a length equal to at least 5 mm and/or segments (6) of fibres of a length less than 5 mm. In this case, the head is provided with a means of cutting the rovings to a predetermined length and provided with a means of dispersing the roving portions, adapted to be activated when fibre segments (6) have to be deposited in the mould.

In order to obtain the roving segments (9) according to the invention, it is important that the rovings of carbon fibres (or precursor) remain in the form of roving and not have a tendency to disperse into isolated fibres. For this, rovings of carbon fibres (or precursor) are cut which are for preference lubricated or pre-impregnated with resin.

To obtain the fibre segments (6) according to the invention, it is in contrast important for the fibre segments to consist of isolated fibres or, failing this, a small number of associated fibres. For this, rovings of carbon fibres (or carbon precursor) which are preferably neither lubricated nor pre-impregnated, are crushed.

However, tests have shown that fibre segments (6) might also be obtained from segments of short length lubricated or pre-impregnated rovings by using sufficient dispersion means to disperse these roving segments so that they become fibre segments.

It may be advantageous to supply the head intended to deliver fibre segments (6) directly with fibre segments (6) instead of with long rovings. Indeed, fibre segments of short mean length, typically less than 1 mm, may be obtained by crushing various residue or scrap fibres which constitutes a particularly economical source of supply.

The crushed carbon fibre takes the form of a powder which can be carried and displaced either by gravity or by a pneumatic drive means, or it may take the form of a dispersion in a liquid. In this case, so that the gas or liquid carrying the powder can be drawn off preferably through the bottom of the mould, the bottom of the mould shall be provided with holes and possibly provided with means permitting the gas or liquid to be extracted through the bottom of the mould by a suction or drawing process.

Preliminary tests have made it possible to establish as a function of various parameters and particularly the length of the roving or fibre segments, the relationship between the height (z) of a portion of fibrous substrate in the mould and the height of the same portion in the compressed fibrous substrate, that is to say in fact in the friction element itself since the compressed fibrous substrate undergoes few dimensional changes during subsequent densification treatment.

ADVANTAGES

Over and above the aforesaid technical advantages of the friction element, the method and the apparatus according to the invention also enjoy numerous advantages.

The apparatus according to the invention makes it possible reproducibly and automatically to produce any profile of fibrous substrate of variable texture by "linear combination" of two materials, one of fine texture the other of coarse texture. The invention makes it possible to obtain a three-dimensional fibrous substrate comprising inter-entangled segments of rovings and/or of fibres the texture of which is predetermined according to the coordinates (z, $\rho$, $\theta$) of any point or portion of volume in the space occupied by the fibrous substrate constituting the reinforcement of the friction element.

This method therefore lends itself to complete automation, which also makes it possible to change production, possibly by simply changing the mould filling programme. FIGS. 4, 5 and 8 illustrate some of these possibilities, particularly the simple case where the fibrous substrate consists of layers of homogeneous texture per plane (FIGS. 4-1, 4-2, 5-2).

The invention therefore constitutes a means of reproducibly and automatically producing friction elements which comprise a fibrous substrate of any predetermined texture, so that it is possible to obtain both friction elements "to measure" at competitive prices and also to respect the demands of assured quality. Indeed, in numerous cases, these friction elements have to comply with a high level of assured quality which is not readily compatible with manufacturing processes which are not highly or not at all automated, knowing that in the manufacture of a composite material, the continuous matrix poses fewer quality problems than the discontinuous substrate. The competitive prices result from numerous elements: economy of material since a friction element may be obtained directly in the desired form, the possibility of using carbon rovings which are less expensive than crushed carbon fibres or woven materials which are in turn less costly than carbon rovings, and finally there is the economy of the process which is linked with its automation.

BRIEF DESCRIPTION OF THE DRAWINGS

FIG. 1-1 shows diagrammatically in cross-section a multi-layer friction element comprising a structure layer (1) and two friction layers (2) situated one on each side of it.

FIG. 1-2 is similar to FIG. 1-1 but also shows two connecting layers (4) for connecting the structure layer (1) and the two friction layers (2).

FIG. 1-3 diagrammatically shows the coarse texture 5g and FIG. 1-4 diagrammatically shows the fine texture 5f, representations which are employed in FIGS. 1-1, 1-2, 4-1 to 4-4.

FIG. 2-1 diagrammatically shows a coarse texture 5g constituted by roving segments (9).

FIG. 2-2 diagrammatically shows a fine texture 5f constituted by carbon fibre segments (unitary fibres or a small number of associated unitary fibres) (6).

FIG. 3-1 shows in vertical section a mould (10) being filled by two associated distribution heads (8), one for fibre segments and one for roving segments. Data means (not shown in the drawing) with a mould filling programme ensure displacement of the heads the position of which is defined by their coordinates (z, $\rho$, $\theta$), and the distribution of rovings locally producing the desired texture, envisaged by the programme (fine/coarse/intermediate by mixture of the two textures), in such a way as to ensure filling of the mould by successive layers (11, 12).

FIG. 3-2 is similar to FIG. 3-1 but the mould has a central orifice.

FIG. 3-3 diagrammatically shows the case where the structure layer (1) consists of an arrangement of orientated fibrous substrate (13) which is introduced into the mould during the course of filling.

FIGS. 4-1 to 4-4 show sections taken on the axis Z through various friction elements varying in geometry and texture. FIGS. 4-1a to 4-3a show the texture of the fibrous substrate in the plane AA' at right-angles to the axis Z.

FIGS. 5-1 to 5-3 comprise for each of them a diagrammatic representation of the texture of the fibrous substrate in section and also a diagram showing in abscissa the texture which ranges from "f" to "g", "f" representing the fine texture and "g" the coarse texture while the ordinate Z represents the distance z of a layer from the bottom part of the fibrous substrate taken as the point of origin. FIG. 5-1 shows a discontinuity in the fibrous substrate. FIGS. 5-2 and 5-3 show a continuity of fibrous substrate with in the case of FIG. 5-2 a zone of mixture of the segments of rovings and fibres of slight thickness whereas in FIG. 5-3 the transition from the layer of segments (12) of just rovings to the layers of segments of just fibres (11) occurs progressively over a relatively considerable thickness.

FIG. 7-1 represents distribution of the porosity per class of pores for the compressed fibrous substrate of coarse texture in Example 1. FIG. 7-2 shows the same distribution but for the finely textured compressed substrate. On the abscissa is shown the pore diameter in $\mu$m with the intervals between each class of pores (a non-linear scale). On the ordinate is shown the percentage of the pore volume per class of pores related to the total volume of the sample.

FIGS. 8-1 and 8-2 represent in sections on the axis Z through other examples of friction elements with a peripheral reinforcement of the structure layer, in contrast to FIGS. 4-3 and 4-4 which have an axial reinforcement.

EXAMPLES

Figure 6:
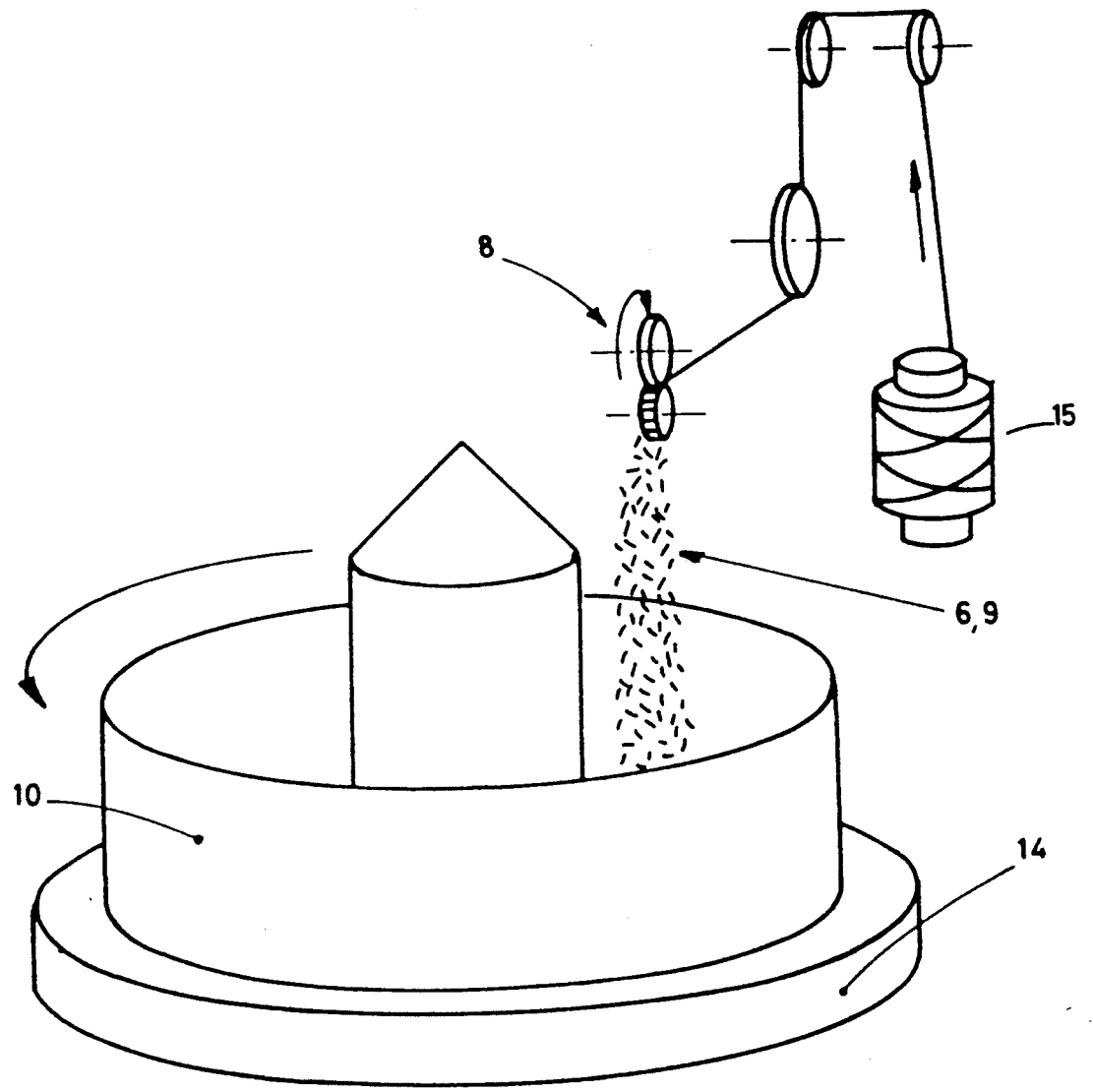
FIG. 6 shows a simplified apparatus which has been used for carrying out Examples 1 to 3. A mould (10) with a central orifice is installed on a rotating drum (14). A distribution head (8) cuts and distributes the segments (9, 6) either of rovings or of fibres according to the nature of the reel (15) of carbon fibre (lubricated or not, respectively).

The following Examples and the drawings show some of the possibilities afforded by the invention:

EXAMPLE 1

1. Production of a fibrous substrate using the apparatus in FIG. 6.

A first layer of fine texture and consisting of fibre segments is formed to a thickness of 60 mm in a cylindrical mould (10) 800 mm in diameter and 200 mm high and having a central orifice 180 mm in diameter. These fibre segments have been obtained from a roving of very long carbon fibre, of 12,000 elementary fibres, by cutting it into segments 1 mm in length. As this roving is neither lubricated nor pre-impregnated, the roving segments can be dispersed into elementary fibre segments which are randomly orientated in the mould.

A second layer of coarse texture is formed to a thickness of 80 mm and consists of roving segments. These segments were obtained from a lubricated roving of very long carbon fibres, of 12,000 elementary fibres, by cutting it into 20 mm segments. It was observed that the roving segments had no tendency to become dissociated.

Finally, a third layer identical to the first was formed. The total height is about 200 mm.

The fibrous substrate thus obtained was compressed in the mould. Its height after compression is 26 mm. It comprises three layers. Each type of layer is characterised, the layer of coarse texture and the layer of fine texture, after the onset of densification by carbon deposition to an apparent density of approx. 0.9: The coarsely textured layer has a porosity (pore volume) of 30%. The distribution of its pore diameters is as shown in FIG. 7-1. By a simple interpolation calculation, it is established that the mean pore diameter is close to 140 μm. The finely textured layer has a porosity of 42%. The distribution of the diameter of its pores is that shown in FIG. 7-2. Its mean pore diameter is close to 13 μm.

2. Densification of the fibrous substrate obtained.

The compressed fibrous substrate which can be handled and which has substantially the final dimensions of the friction element which is to be obtained, has been subjected to a process of densification by vapour phase deposition of pyrolytic carbon at a temperature of 1050° C.

In this way, a friction element of composite material is obtained which has a density of 1.75.

EXAMPLE 2

A friction element was produced which differs by the structure layer (1): a roving of 6,000 elementary fibres was used, instead of the 12,000 fibre roving which was used in Example 1. The other parameters remained identical.

EXAMPLE 3

As a fibrous substrate for the structure layer (1) of coarse texture an arrangement of woven fabrics obtained from rovings of 3,000 elementary fibres was used. The other parameters remained identical.

EXAMPLE 4

As a fibrous substrate for finely textured friction layers according to Example 1, powdered crushed carbon fibres consisting of fibre segments having an average length of around 200 μm were used.

A mould with a perforated bottom was used in order to be able to introduce the carbon fibre powder in the form of a dispersion in an aqueous medium which limits the adverse effects caused by dust.

After compression, a fibrous substrate 27 mm thick was obtained, consisting of a central coarsely textured layer 17 mm thick and with an apparent density of 0.5, and constituted by two finely textured lateral layers each 5 mm thick and with an apparent density of 0.15. Its overall apparent density is 0.175.

The other elements of the test are those in Example 1.

Properties of the friction elements obtained (Examples 1 to 4):

In respect of the various layers of type (1) (coarse texture) and type (2) (fine texture) obtained, the intrinsic properties of each layer have been characterised.

In particular, the resilience was measured (conventional conditions: impact of a suspended weight on a test sample with an impact energy of 7.5 J), the resistance to flexion and the relative rate of wear under low or high dissipated energy levels.

|  | Resilience kJ/m$^2$ | Flexion MPa | Relative Wear a(*) | b(*) |
|---|---|---|---|---|
| Layer 1 - Ex. 1 | 50 | 150 | 6 | 20 |
| Layer 1 - Ex. 2 | 41 | 200 | 4 | 18 |
| Layer 1 - Ex. 3 | 40 | 220 | 4 | 24 |
| Layer 2 - Ex. 1–3 | 3.5 | 115 | 1 | 12 |
| Layer 2 - Ex. 4 | 2.5 | 45 | 0.3 | 10 |

(*)The condition "a" corresponds to a measurement of wear rate at low dissipated energy while condition "b" corresponds to a measurement with high dissipated energy.

These comparative results are an illustration of the major interest of a differential texture such as that defined in the present invention. It is important in particular to note the low level of wear found in the case of the friction layer (2) obtained with crushed carbon fibre powder. The Applicants having observed that the orientation of the fibre segments was all the more random when these segments were short and that the growth of pyrocarbon during the operation of densification by carbon deposition in the vapour phase took place in parallel with the orientation of the fibre segments, hypothesised that the rate of wear of the friction layer was undoubtedly linked with the orientation of the fibre segments.

What is claimed is:

1. A multi-layer friction element comprising a structure layer of carbon-carbon composite material having at least one face covered with a friction layer (2) of carbon-carbon composite material rigid with said structure layer, the structure layer being obtained from a fibrous substrate (5g) of coarse texture having a mean pore diameter in excess of 100 μm and comprising rovings segments of elementary carbon fiber or carbon fiber precursor, said roving segments containing at least 1000 elementary fibers, and the friction layer (2) being obtained from a fibrous substrate of fine texture having a mean pore diameter less than 50 μm and comprising fiber segments (6) of elementary carbon fiber or carbon fiber precursor which are randomly distributed, said roving segments containing at least 10 times the number of elementary fibers as said fiber segments.

2. A friction element according to claim 1 in which the structure layer is obtained from a fibrous substrate (5g) comprising randomly distributed fiber carbon precursor or carbon fiber roving segments (9).

3. A friction element according to claim 2 in which the length of said roving segments is between 5 and 60 mm and the length of the fiber segments is between 0.05 and 60 mm.

4. A friction element according to claim 1 in which the length of the fiber segments is between 1 and 60 mm.

5. A friction element according to any one of claims 1 to 4 in which the fibrous substrate forms an uninterrupted inter-entanglement of segments, roving segments (9) in the structure layer, fiber segments (6) in the friction layer (2), and roving and fiber segments in any proportions in an intermediate part between said structure layer and said friction layer.

6. A friction element according to claim 1 in which the fibrous substrate (5g) of the structure layer comprises an oriented fibrous substrate (13) of woven carbon fiber or carbon precursor materials.

7. A friction element according to any one of claims 1 to 4 or 6 in which the fibrous substrate of the friction layer (2) comprises a mat or a felt of carbon fiber precursor or carbon fibres.

8. A friction element according to any one of claims 1 to 4 or 6 in which the structure layer is obtained from a compressed fibrous substrate (5g) of an apparent density between 0.3 and 0.7 g/cm$^3$.

9. A friction element according to any one of claims 1 to 4 or 6 in which the friction layer is obtained from a fibrous substrate of an apparent density between 0.05 and 0.3 g/cm$^3$.

10. A friction element according to any one of claims 1 to 4, or 6 in which the structure layer and the friction layer (2) are rendered integral by a connecting layer (4).

11. A friction element according to any one of claims 1 to 4 or 6 in which the fibrous substrate of said friction layer (2) comprises crushed carbon fiber comprising fiber segments of a length between 0.05 and 1 mm.

12. A friction element according to any one of claims 1 to 4 or 6 in which said fiber segments comprise fewer than 100 elementary fibres.

* * * * *